United States Patent
Chung et al.

(10) Patent No.: US 8,724,571 B2
(45) Date of Patent: May 13, 2014

(54) CARRIER CONSTRUCTION FOR EFFECTIVE CONTROL CHANNEL DECODING

(75) Inventors: Jae Hoon Chung, Anyang-si (KR); Han Gyu Cho, Anyang-si (KR); So Yeon Kim, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 219 days.

(21) Appl. No.: 13/265,305

(22) PCT Filed: Mar. 20, 2010

(86) PCT No.: PCT/KR2010/002470
§ 371 (c)(1),
(2), (4) Date: Oct. 19, 2011

(87) PCT Pub. No.: WO2010/123257
PCT Pub. Date: Oct. 28, 2010

(65) Prior Publication Data
US 2012/0051306 A1 Mar. 1, 2012

Related U.S. Application Data

(60) Provisional application No. 61/170,660, filed on Apr. 20, 2009, provisional application No. 61/223,700, filed on Jul. 7, 2009.

(51) Int. Cl.
*H04W 4/00* (2009.01)
*H04W 72/04* (2009.01)
*H04L 5/00* (2006.01)

(52) U.S. Cl.
CPC ............. *H04W 72/042* (2013.01); *H04L 5/001* (2013.01); *H04L 5/0094* (2013.01)
USPC .......................................... 370/329; 370/339

(58) Field of Classification Search
CPC .... H04W 72/042; H04L 5/001; H04L 5/0094
USPC .................................................. 370/329, 339
See application file for complete search history.

(56) References Cited

U.S. PATENT DOCUMENTS

| 2009/0055702 | A1 | 2/2009 | Kim et al. | |
| 2010/0118746 | A1* | 5/2010 | Gerlach | 370/281 |
| 2011/0274066 | A1* | 11/2011 | Tee et al. | 370/329 |
| 2013/0077585 | A1* | 3/2013 | Pan et al. | 370/329 |

FOREIGN PATENT DOCUMENTS

| WO | WO 2008-024890 A2 | 2/2008 |
| WO | WO 2008/024890 A2 | 2/2008 |
| WO | WO 2009-000697 A2 | 12/2008 |
| WO | WO 2009/000697 A2 | 12/2008 |
| WO | WO 2009/046052 A2 | 4/2009 |
| WO | WO 2009-046052 A2 | 4/2009 |

* cited by examiner

*Primary Examiner* — Sai-Ming Chan
(74) *Attorney, Agent, or Firm* — McKenna Long & Aldridge LLP

(57) ABSTRACT

The present invention relates to a wireless communication system. More particularly, the present invention relates to a method and to an apparatus in which a terminal processes a downlink control channel in a wireless communication system that supports carrier aggregation. The method comprises the steps of: checking a plurality of carrier groups from a plurality of downlink component carriers (DL CCs); receiving a control information region through at least a portion of the plurality of DL CCs; performing blind decoding on control channels in the control information region in a first carrier group; and performing blind decoding on control channels in the control information region in a second carrier group. The present invention also relates to an apparatus for the method.

6 Claims, 12 Drawing Sheets

FIG. 9

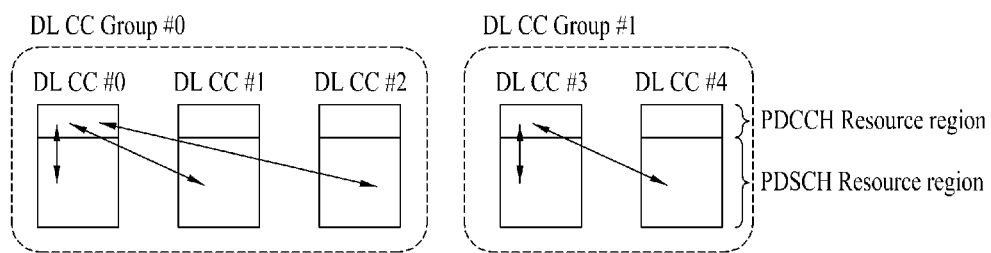

Meaning of DL CC group: one or more DL CCs carrying DL channel assignment PDCCH for
PDSCH transmission on one or more DL CCs (i.e. DL CC group is defined as scheudling DL CC(s))
DL CC of DL CC group is assigned as scheduling DL CC ←——→ Linkage between DL CC and UL CC DL Scheduling CC: DL CC carrying DL channel assignment PDCCH for PDSCH transmission
DL Scheduled CC: DL CC carrying PDSCH

CARRIER CONSTRUCTION FOR EFFECTIVE CONTROL CHANNEL DECODING

This application is a 35 U.S.C. §371 National Stage entry of International Application No. PCT/KR2010/002470, filed on Apr. 20, 2010, and claims the benefit of U.S. Provisional Application Nos. 61/170,660, filed Apr. 20, 2009, and 61/223,700, filed Jul. 7, 2009, each of which are hereby incorporated by reference in their entireties as if fully set forth herein.

TECHNICAL FIELD

The present invention relates to a wireless communication system, and more particularly, to a method and apparatus for configuring a Component Carrier (CC) in a wireless communication system supporting carrier aggregation.

BACKGROUND ART

Wireless communication systems have been widely deployed to support various types of communication services including voice or data service. Typically, a wireless communication system is a multiple access system that can support communication of multiple users by sharing available system resources (a bandwidth, transmission power, etc.) among them. Multiple access systems include, for example, a CDMA (code division multiple access) system, an FDMA (frequency division multiple access) system, a TDMA (time division multiple access) system, an OFDMA (orthogonal frequency division multiple access) system, an SC-FDMA (single carrier frequency division multiple access) system, an MC-FDMA (multi carrier frequency division multiple access) system, etc. In the wireless communication system, a User Equipment (UE) can receive information from a Base Station (BS) on a downlink and transmit information to the BS on an uplink. The UE transmits or receives data and various control information. Various physical channels are defined depending on the types and usages of information that the UE transmits and receives.

DISCLOSURE

Technical Problem

An object of the present invention devised to solve the conventional problem is to provide a method and apparatus for configuring CCs to effectively decode control channels in a wireless communication system.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for processing a downlink control channel at a UE (User Equipment) in a wireless communication system supporting carrier aggregation includes determining a plurality of carrier groups into which a plurality of downlink component carriers (DL CCs) are grouped, receiving a control information region through at least a part of the plurality of DL CCs, performing blind decoding on control channels in the control information region in a first carrier group, and performing blind decoding on control channels in the control information region in a second carrier group.

In another aspect of the present invention, a UE supporting carrier aggregation includes a Radio Frequency (RF) unit for transmitting and receiving a radio signal to and from a Base Station (BS) on multiple component carriers (CCs), a memory for storing information transmitted to and received from the BS and a parameter needed for an operation of the UE, and a processor connected to the RF unit and the memory, for controlling the RF unit and the memory. The processor is adapted to determine a plurality of carrier groups into which a plurality of downlink CCs (DL CCs) are grouped, receive a control information region through at least a part of the plurality of DL CCs, perform blind decoding on control channels in the control information region in a first carrier group, and perform blind decoding on control channels in the control information region in a second carrier group.

The control information region may include one or more contiguous OFDM (Orthogonal Frequency Division Multiplexing) symbols and the control channels include a PDCCH (Physical Downlink Control Channel).

The plurality of carrier groups may be determined based on a linkage between the plurality of DL CCs and a plurality of uplink component carriers (UL CCs).

The plurality of carrier groups may be determined based on a linkage between a scheduling CC and a scheduled CC. In this case, the plurality of carrier groups may be determined based on a linkage between a downlink scheduling CC and an uplink scheduled CC. In addition, the plurality of carrier groups may be determined based on a linkage between a downlink scheduling CC and a downlink scheduled CC.

The plurality of carrier groups may be indicated by RRC (Radio Resource Control) signaling or L1/L2 (Layer 1/Layer 2) control signaling.

Advantageous Effects

According to the embodiments of the present invention, control channels can be effectively decoded in a wireless communication system supporting multiple carriers.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIGS. 8 and 9 illustrate other exemplary carrier groupings based on DL/UL CC linkage according to embodiments of the present invention;

BEST MODE FOR CARRYING OUT THE INVENTION

The configuration, operation, and other features of the invention will become apparent to those having ordinary skill in the art upon examination of the following embodiments of the present invention described with reference to the attached drawings. The embodiments of the present invention can be used for various radio access technologies such as CDMA, FDMA, TDMA, OFDMA, SC-FDMA, and MC-FDMA. CDMA may be implemented as a radio technology such as UTRA (Universal Terrestrial Radio Access) or CDMA2000. TDMA may be implemented as a radio technology such as GSM (Global System for Mobile communications)/GPRS (General packet Radio Service)/EDGE (Enhanced Data Rates for GSM Evolution). OFDMA may be implemented as a radio technology such as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP ($3^{rd}$ Generation Partnership Project) LTE (long term evolution) is a part of E-UMTS (Evolved UMTS) using E-UTRA, and LTE-A (Advanced) is an evolved version of 3GPP LTE.

While the embodiments of the present invention will be described below in the context that the technical features of the present invention are applied to a 3GPP system, this is purely exemplary and thus should not be constructed as limiting the present invention.

Although the present invention is described as conforming to LTE-A, proposed concepts or methods of the present invention and their embodiments are applicable to other systems using multiple carriers (e.g. an IEEE 802.16m system) without restriction.

Figure 1:
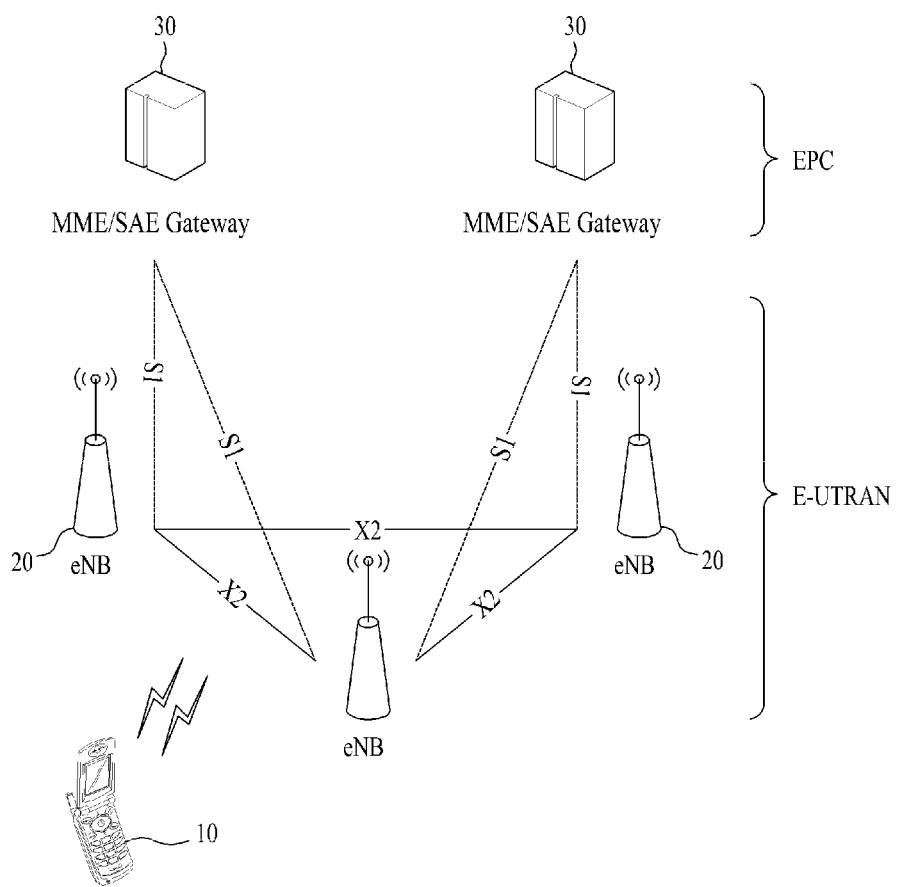
FIG. 1 illustrates an exemplary configuration of an E-UMTS (Evolved Universal Mobile Telecommunications System) network.

FIG. 1 illustrates the configuration of an E-UMTS network. E-UMTS is also called an LTE system. A communication network is widely deployed to thereby provide various communication services including voice and packet data services.

Referring to FIG. 1, the E-UMTS network includes an E-UTRAN (Evolved Universal Terrestrial Radio Access Network), an EPC (Evolved Packet Core), and a User Equipment (UE). The E-UTRAN includes one or more eNode Bs (eNBs) 20 and one or more UEs 10 may be located in a cell. Mobility Management Entity/System Architecture Evolution (MME/SAE) gateways 30 are located at an end of the network and thus can be connected to an external network. Downlink refers to communication from an eNB 20 to a UE 10 and uplink refers to communication from the UE to the eNB.

A UE 10 is a communication device carried by a user and an eNB 20 is generally a fixed station that communicates with the UE 10. The eNB 20 provides user-plane and control-plane end points to the UE 10. One eNB 20 may be deployed per cell. An interface for transmitting user traffic or control traffic may be used between eNBs 20. The MME/SAE gateways 30 provide an end point with a session and mobility management function to the UE 10. The eNBs 20 may be connected to the MME/SAE gateways 30 via S1 interfaces.

The MME provides various functions including distribution of paging messages to the eNBs 20, security control, idle-state mobility control, SAE bearer control, and encryption and integrity protection of Non-Access Stratum (NAS) signaling. The SAE gateway host provides various functions including termination of user-plane packets and user-plane switching to support UE mobility. For clarity, an MME/SAE gateway 30 will be referred to simply as a gateway, but it is to be understood that the MME/SAE gateway 30 includes both an MME and an SAE gateway.

A plurality of nodes may be connected between an eNB 20 and a gateway 30 via an S1 interface. eNBs 20 may be connected to each other via an X2 interface, and neighboring eNBs 20 may have a meshed network structure with an X2 interface.

Figure 2:
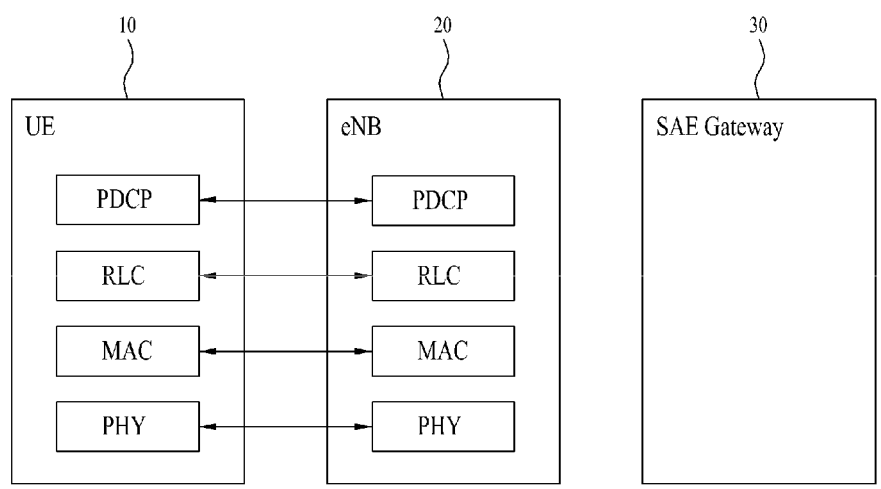
FIGS. 2 and 3 illustrate exemplary E-UMTS user-plane/control-plane protocols.
Figure 3:
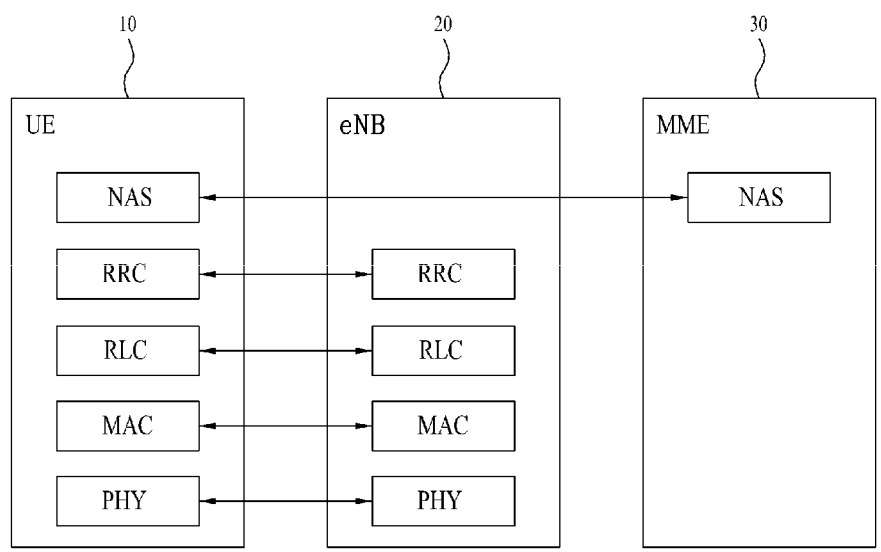

FIGS. 2 and 3 illustrate user-plane and control-plane protocol stacks for E-UMTS. Referring to FIGS. 2 and 3, the protocol layers may be divided into Layer 1 (L1), Layer 2 (L2), and Layer 3 (L3) based on the lowest three layers of the Open System Interconnection (OSI) reference model known in the field of communication systems.

The Physical (PHY) layer at L1 provides an information transfer service to its higher layer on physical channels. The PHY layer is connected to its higher layer, the Medium Access Control (MAC) layer through transport channels and data is transmitted between the MAC layer and the PHY layer through the transport channels. Data is transmitted between the PHY layers of a transmitter and a receiver on physical channels.

At L2, the MAC layer provides a service to its higher layer, the Radio Link Control (RLC) layer through logical channels. The RLC layer at L2 supports reliable data transmission. When the MAC layer takes charge of the RLC functionalities, the RLC layer is incorporated as a function block into the MAC layer. The Packet Data Convergence Protocol (PDCP) layer at L2 performs a header compression function. Owing to the header compression function, Internet Protocol (IP) packets such as IPv4 or IPv6 packets can be efficiently transmitted via a radio interface having a relatively narrow bandwidth.

The Radio Resource Control (RRC) layer at the lowest of L3 is defined only on the control plane. The RRC layer controls logical channels, transport channels, and physical channels in relation to configuration, reconfiguration, and release of Radio Bearers (RBs). An RB refers to a service provided at L2, for data transmission between the UE 10 and the E-UTRAN.

Figure 4:
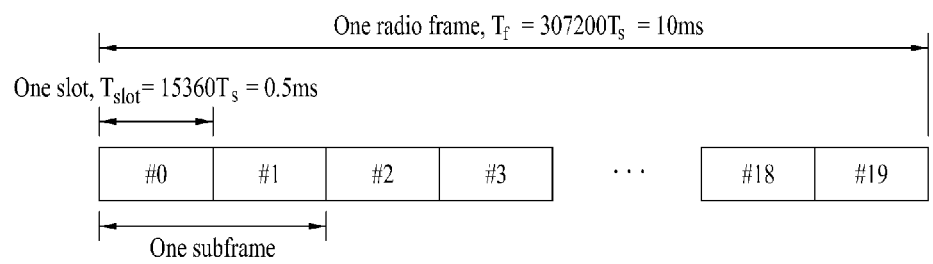
FIG. 4 illustrates an exemplary structure of a radio frame in an LTE system.

FIG. 4 illustrates a radio frame structure in the LTE system.

Referring to FIG. 4, a radio frame is 10 ms (327200 $T_S$) in duration. The radio frame is divided into 10 equal subframes, each subframe being 1 ms long. Each subframe is further divided into two slots, each slot of 0.5 ms in duration. $T_s$ represents a sampling time and is given as $T_S=1/(15 \text{ kHz} \times 2048)=3.2552\times10^{-8}$ (about 33 ns). A slot is defined as a plurality of OFDM (Orthogonal Frequency Division Multiplexing) (or SC-FDMA) symbols in time by a plurality of Resource Blocks (RBs) in frequency. One RB has 12 subcarriers by 7 (6) OFDM symbols in the LTE system. This radio frame structure is purely exemplary and thus the number/length of subframes, the number/length slots, or the number/length OFDM (or SC-FDMA) symbols may vary.

Figure 5:
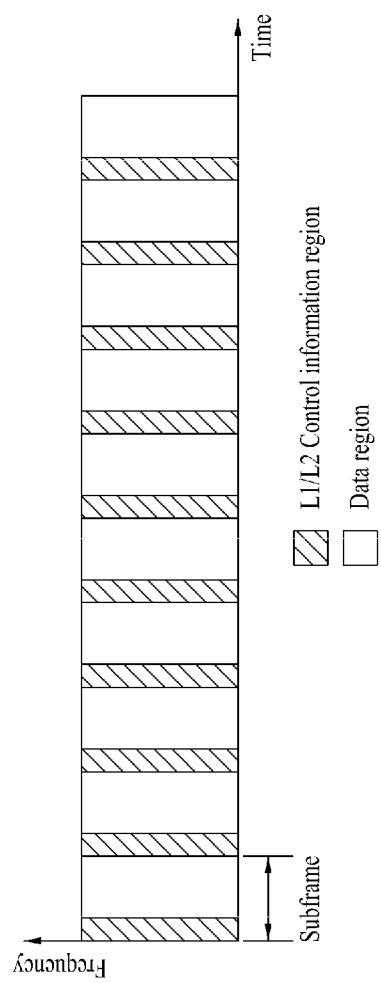
FIG. 5 illustrates an exemplary structure of a downlink subframe.

FIG. 5 illustrates a downlink subframe structure.

Referring to FIG. 5, a downlink subframe includes an L1/L2 control information region for transmitting scheduling information and other control information and a data region for transmitting downlink data. The control region starts from the first OFDM symbol of the downlink subframe, spanning one or more OFDM symbols. The size of the control region may be determined independently for each subframe. Various control channels including a PDCCH (Physical Downlink Control CHannel) are mapped to the control region. The PDCCH is a physical downlink control channel allocated to the first n OFDM symbols of the downlink subframe. The PDCCH includes one or more CCEs (Control Channel Elements). A CCE includes 9 neighboring REGs (Resource Element Groups), each REG having 4 neighboring REs (Resource Elements) except reference signals. An RE is a minimum resource unit defined as one subcarrier by one OFDM symbol.

The PDCCH delivers resource assignment-related information about transport channels, i.e. a PCH (Paging CHannel) and a DL-SCH (Downlink-Shared CHannel), an Uplink Scheduling Grant, HARQ information, etc. to a UE. Control information carried on the PDCCH is collectively called Downlink Control Information (DCI). Various formats are available to the PDCCH according to information carried on the PDCCH. The DCI has various DCI formats according to its contents. For example, Table 1 below illustrates DCI format 0 related to uplink scheduling.

TABLE 1

| Field | Bits | Comment |
|---|---|---|
| Format | 1 | Uplink grant or downlink assignment |
| Hopping flag | 1 | Frequency hopping on/off |
| RB assignment | 7 | — |
| MCS | 5 | — |
| DMRS | 3 | Cyclic shift of demodulation reference signal |
| . | . | . |
| . | . | . |
| . | . | . |
| RNTI/CRC | 16 | 16 bit RNTI implicitly encoded in CRC |
| Total | 38 | — |

* MCS: Modulation and Coding Scheme
* RNTI: Radio Network Temporary Identifier
* CRC: Cyclic Redundancy Check A UE for which the PDCCH is destined is identified by an RNTI. For example, if the CRC of a PDCCH is masked by RNTI A and delivers uplink radio resource allocation information B (e.g. a frequency position) and transport format information C (e.g. a transport block size, a modulation scheme, coding information, etc.), UEs in a cell monitor the PDCCH using their RNTIs and a UE having RNTI A transmits uplink data based on information B and C acquired from the PDCCH.

The PDCCH is channel-encoded to be robust against transmission errors. In the LTE system, PDCCH information bits are encoded to a convolution code, rate-matched, and then scrambled with a cell-specific sequence. Scrambled bits are mapped to 4-QPSK (Quadrature Phase Shift Keying) symbol blocks (REGs). The symbol blocks are interleaved, for frequency diversity, and mapped to the physical resources of OFDM symbols indicated by a PCFICH (Physical Control Format Indicator Channel). The PCFICH indicates the number of OFDM symbols to which the PDCCH is to be allocated.

Considering that a UE should decode a number of control channels, decoding complexity in relation to the PDCCH is very important. For instance, on the assumption that the PDCCH can be allocated to any of PDCCH resources (or CCEs) indicated by the PCFICH, the UE should check all possible PDCCH positions, PDCCH formats, and DCI formats, considering that the CRC of the PDCCH is masked by an RNTI. Blind decoding of all possible combinations means that the UE attempts a large number of PDCCH decodings in each subframe. Although the load of blind decoding is acceptable in case of a narrow system band, it is huge in case of a broad system band because there are a lot of possible PDCCH positions, thereby causing excess power consumption to a UE receiver. For example, if blind decoding is performed at 100 CCE positions to receive PDCCH format 0, the load is approximate to load resulting from continuous reception of data at about 4 Mbps.

To relieve the PDCCH decoding load, the LTE system restricts positions at which the UE should monitor to detect a PDCCH directed to it. A set of CCE positions at which a UE should monitor a PDCCH is called a search space. In LTE, the search space has a different size for each PDCCH format. PDCC search spaces are divided into a dedicated search space (or a UE-specific search space) and a common search space. The dedicated search space is set for an individual UE, while the common search space is common to a plurality of UEs. The dedicated search space may be overlapped with the common search space.

Table 2 below illustrates an example of a dedicated search space and a common search space.

TABLE 2

| | Search space $S_k^{(L)}$ | | Number | |
|---|---|---|---|---|
| Type | Aggregation level L | Size [in CCEs] | of PDCCH candidates $M^{(L)}$ | DCI formats |
| UE-specific | 1 | 6 | 6 | 0, 1, 1A, 1B, 2 |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

In Table 2, an aggregation level is the number of CCEs included in a PDCCH.

Blind decoding of a PDCCH at a UE will be described in great detail. Referring to FIG. 2, for example, the UE may search for DCI format 0 and DCI format 1A that have the same size and are identified by a flag in DCI in the dedicated search space and may additionally search for a DCI format (i.e. 1, 1B or 2) according to a PDSCH transmission mode. In the common search space, the UE may search for DCI format 1A and DCI format 1C and may additionally search for DCI format 0 and DCI format 3 or DCI format 3A of the same size as DCI format 1A. In this case, the UE may have to perform, for example, up to 44 blind decodings in each subframe.

Figure 6:
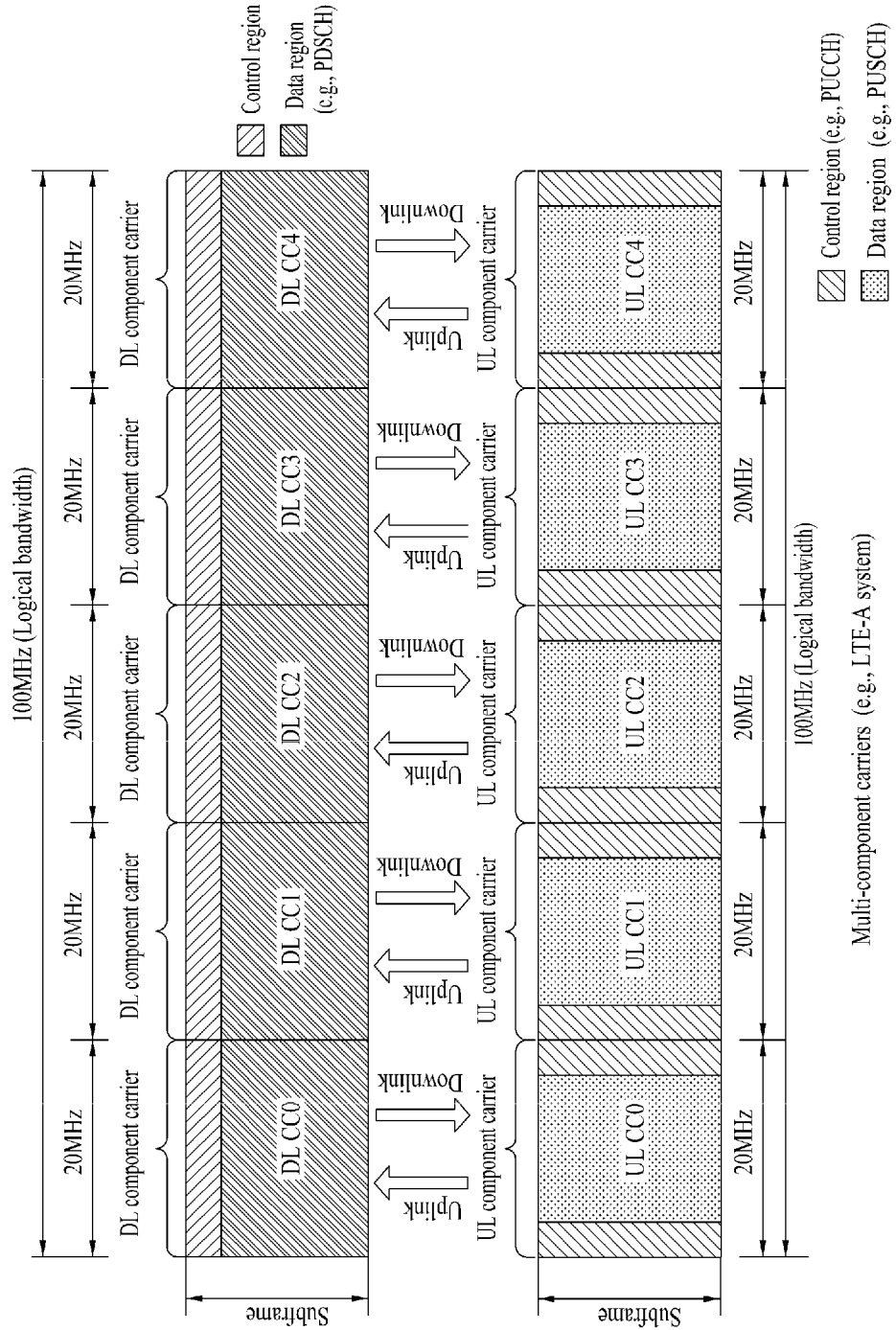
FIG. 6 illustrates an example in which communication is conducted in a multi-CC environment.

FIG. 6 illustrates exemplary communication in a multi-CC situation. This communication may take place in an LTE-A system. The LTE-A system adopts carrier aggregation or bandwidth aggregation that enables use of a wider uplink/downlink bandwidth by collecting a plurality of uplink/downlink frequency blocks. Each frequency block is transmitted using a CC. A CC may refer to a frequency block used for carrier aggregation or the central carrier of the frequency block depending on circumstances. The CC may be referred to simply as a carrier and unless otherwise specified, the CC includes a UL CC (Uplink CC) and/or a DL CC (Downlink CC).

Referring to FIG. 6, a 100-MHz bandwidth may be supported for an uplink/downlink by aggregating 5 20-MHz CCs. The CCs may be adjacent or scattered in the frequency domain. For the convenience' sake, the bandwidth of each UL CC is shown as equal to that of each DL CC and UL CCs and DL CCs are shown as symmetrical in FIG. 6. However, the bandwidths of individual CCs may be set differently according to an available frequency environment. For example, the bandwidths of UL CCs may be configured into 5 MHz (UL CC0)+20 MHz (UL CC1)+20 MHz (UL CC2)+20 MHz (UL CC3)+5 MHz (UL CC4). Asymmetrical carrier aggregation is also possible by differentiating the numbers of UL CCs and DL CCs. The asymmetrical carrier aggregation may be caused by the limit of an available frequency band or may be implemented on purpose by a network setting. Meanwhile, even though a total system band spans N CCs, a frequency band available to a specific UE may be restricted to M (<N) CCs.

While an uplink signal and a downlink signal are transmitted in one-to-one mapped uplink and downlink CCs in FIG. 6, the CCs carrying the signals may vary depending on a network setting or the types of the signals. For instance, a scheduling CC carrying a downlink scheduling command may be different from a downlink CC scheduled to carry a signal according to the scheduling command (or a downlink scheduled CC). Likewise, a scheduling CC carrying a downlink scheduling command and an uplink CC scheduled to carry a signal according to the scheduling command (or a uplink scheduled CC) may be set differently from basic CC-to-CC mapping or linkage. This is called cross scheduling (or cross carrier scheduling). Because one DL CC may carry scheduling information for a plurality of DL CCs or a plurality of UL CCs in a cross scheduling environment, the complexity of control information decoding increases remarkably. For example, on the assumption that 5 DL/UL CCs are given and up to 44 (or 60) blind decodings are needed to acquire scheduling information (e.g. information about a PDSCH/PUSCH) from a specific DL CC, when transmissions of PDSCHs having independent transmission modes on up to 5 DL CCs can be scheduled on any of the 5 DL CCs through PDCCHs having DCI formats, a UE should perform up to (44 (or 60)×5)×5 blind decodings. This cross scheduling free of any restriction rapidly increases PDCCH blind decoding overhead according to the number of CCs. However, it is necessary to keep the PDCCH blind decoding overhead at an appropriate level in order to maintain an HARQ timing relationship with respect to a PDSCH or PUSCH and save power by applying a UE's micro-sleep mode to a subframe.

The present invention proposes methods for effectively reducing PDCCH blind decoding overhead that might be otherwise increased excessively to an appropriate level in receiving a plurality of PDSCHs or transmitting a plurality of PUSCHs. Now, a detailed description will be given of embodiments of the present invention with reference to the attached drawings.

Embodiment 1

PDCCH Decoding on Carrier Group Basis

The embodiment of the present invention provides an exemplary method for performing PDCCH blind decoding on a carrier group basis in a wireless communication system supporting carrier aggregation. For example, if DL CC#0 to DL CC#3 are grouped into carrier group 1 and DL CC#4 and DL CC#5 are grouped into carrier group 2, PDCCH decoding for carrier group 1 is restricted to DL CC#0 to DL CC#3 and PDCCH decoding for carrier group 2 is restricted to DL CC#4 and DL CC#5. On the assumption that the maximum number of blind decodings needed to acquire scheduling information for a specific DL/UL CC (e.g. information about a PDSCH/PUSCH) is (or 60) and a scheduling PDCCH can be transmitted in any DL CC of a carrier group, up to (44 (or 60)×3)×3 and (44 (or 66)×2)×2 blind decodings may be performed on carrier group 1 and carrier group 2 in each subframe. Therefore, compared to a case where PDCCH decoding is not performed on a carrier group basis, the number of blind decodings may be reduced to 44 (or 60)×($5^2-3^2-2^2$).

For carrier grouping, in a situation where a plurality of DL/UL CCs are assigned to a UE or a plurality of DL/UL CCs schedule a PDSCH and/or PUSCH for the UE in a subframe, the DL CCs assigned to the UE or the scheduling DL CCs may be grouped into one or more groups in order to effectively reduce PDCCH blind decoding overhead. UL CCs linked to individual DL CCs may also be grouped based on the DL CC grouping. The above-described carrier grouping may be performed in a different manner for each PDCCH (or DCI) format.

For a purpose other than reduction of PDCCH blind decoding overhead, DL CCs assigned to or scheduled for a UE may be grouped. In this case, the carrier grouping scheme designed to serve another purpose may also be utilized to reduce PDCCH blind decoding overhead. For example, in the case of symmetrical or asymmetrical DL CC/UL CC allocation (particularly, when there are more DL CCs than UL CCs), DL CCs linked to a UL CC may be re-interpreted as a carrier group according to the embodiment of the present invention and the resulting carrier groups may be used for the purpose of reducing the overhead of PDCCH blind decoding.

Figure 7:
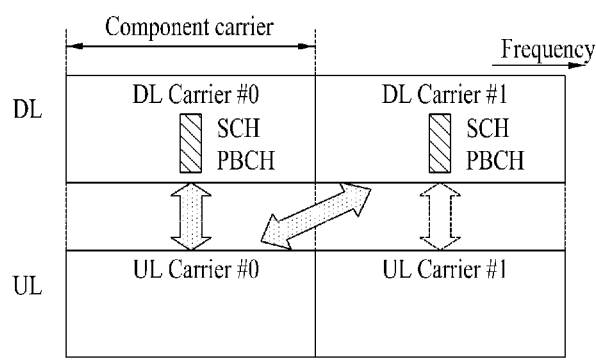
FIG. 7 illustrates exemplary carrier grouping based on DL/UL CC linkage according to an embodiment of the present invention.

FIG. 7 illustrates exemplary carrier grouping based on DL/UL CC linkage. DL CCs linked to a UL CC through asymmetrical DL/UL CC allocation may be interpreted as a group for PDCCH blind decoding. The asymmetrical DL/UL CC allocation may take place due to a UE's capability or the limit of an available band, or may be implemented on purpose by a network setting. The asymmetrical DL/UL CC allocation is purely exemplary and thus the embodiment of the present invention is also applicable to symmetrical DL/UL CC allocation.

An extended case will be considered with reference to FIG. 7. It is assumed that the wireless communication system supports symmetrical carrier aggregation with a plurality of (e.g. 5) DL CCs and a plurality of (e.g. 5) UL CCs as illustrated in FIG. 6. For the convenience' sake of description, FIG. 7 illustrates a basic DL/UL CC linkage in which DL CC #0 is linked to UL CC #0 and DL CC #1 is linked to UL CC #1. In an extension of the basic DL/UL CC linkage, an eNB (or cell) may notify support of 5 DL CCs and 5 UL CCs and an associated DL/UL linkage by broadcasting system information. A cell-specific DL/UL CC assignment and an associated DL/UL linkage may be later changed by UE-specific CC assignment signaling. The UE-specific CC assignment may be performed, taking into account the CC support capability of a UE, a resource request, load balancing, etc. FIG. 7 additionally illustrates a case where an eNB asymmetrically allocates 2 DL CCs and 1 UL CC to a UE ([DL CC #0, DL CC #1|UL CC #0). As an extension of the representation illustrated in FIG. 7, the eNB may allocate additional DL CCs and UL CCs symmetrically/asymmetrically to the UE (e.g. [DL CC #2|UL CC #2] or [DL CC #4|UL CC #1, UL CC #4]. The UE-specific CC assignment may be performed by RRC signaling or L1/L2 control signaling (e.g. a PDCCH, a MAC message, etc.).

In this example, a DL/UL CC linkage configured for the UE is re-interpreted as groups for PDCCH blind decoding. For example, in the above case, the eNB regards (DL CC #0, DL CC #1), (DL CC #2), and (DL CC #5) as groups for PDCCH assignment, and the UE may determine the DC CC groups as groups for PDCCH blind decoding or candidate groups for PDCCH blind decoding. Therefore, if the UE is to receive a PDCCH related to DL CC #0, DL CC1, and UL CC #0, the UE performs PDCCH blind decoding on DL CC #0 and DL CC #1, or on one scheduling DL CC (e.g. DL CC #0 or DL CC #1) configured for all or any of scheduled DL CCs or scheduled UL CCs. Similarly, if the UE is to receive a PDCCH related to DL CC #2 and UL CC #2, the UE performs PDCCH blind decoding only on DL CC #2. In addition, if the UE is to receive a PDCCH related to DL CC #4, UL CC #1, and UL CC #4, the UE performs PDCCH blind decoding only on DL CC #4.

Especially when carrier grouping of the present invention is based on a conventional specific DL/UL linkage configuration, the UE may acquire carrier grouping information from signaling or an implicit relationship establishing scheme made during the specific DL/UL linkage configuration. The linkage configuration is based on the premise that a DL CC is linked to one UL CC, as illustrated in the drawing. The DL/UL linkage configuration of the present invention may cover information about arbitrary linkage that may be configured for DL CCs and UL CCs as well as information about the linkage between DL CCs and UL CCs illustrated in FIG. 7. The DL/UL linkage information may include, for example, information about a linkage between a scheduling CC and a scheduled CC. The scheduling CC includes a DL CC carrying a PDCCH, while the scheduled CC includes a UL CC in the case of uplink scheduling and a DL CC in the case of downlink scheduling. Herein, a CC linkage in which one scheduling CC is configured for any scheduled CC may serve as a premise. This premise is purely exemplary, which should not be construed as excluding a CC linkage in which a plurality of scheduling CCs are configured for any scheduled CC.

A detailed description will be given below of a method for configuring a CC linkage between a scheduled CC and a scheduling CC. In a situation where cross scheduling is defined and a plurality of DL CCs are configured to transmit PDCCHs, it is necessary to define a DL CC (a scheduling DL CC) that will deliver a DL channel assignment PDCCH for a PDSCH transmitted on a DL CC (i.e. a scheduled DL CC) or a UL grant PDCCH for a PUSCH transmitted on a UL CC (i.e. a scheduled UL CC). The following methods may be considered.

Method 1: Predetermined or Implicit Relationship between DL CC Carrying PDCCH and DL CC Carrying PDSCH (or UL CC Carrying PUSCH)

In the case of cross scheduling, an individual DL CC (i.e. a scheduling DL CC) may be defined implicitly according to a pre-defined rule to carry a channel assignment PDCCH for transmission of a PDSCH on a DL CC (i.e. a scheduled DL CC) and/or a UL grant PDCCH for transmission of a PUSCH on a UL CC (i.e. a scheduled UL CC). For example, the scheduling DL CC may be implicitly defined in a dynamic manner according to a pre-defined relationship or a situation, using a DL CC index/UL CC index to which cross scheduling is applied, a UE ID (e.g. an RNTI (Radio Network Temporary Identity)), a C-RNTI (Cell-RNTI), or a subframe index, without explicit signaling.

For example, given A DL CCs available for transmission of a DL channel assignment PDCCH or a UL grant PDCCH, the DL CCs that can transmit the PDCCH may be numbered from CC index #0 to CC index # (A−1). Meanwhile, the absolute indexes (or logical carrier indexes indicated by a DL/UL carrier assignment (or a DL/UL active set assignment)) of the remaining DL CCs available for transmission of a PDSCH except the DL CCs available for transmission of a PDCCH and the remaining UL CCs available for transmission of a PUSCH except UL CCs linked to the PDCCH-transmittable DL CCs are denoted by i and j, respectively. In this situation, a DL channel assignment PDCCH associated with transmission of a PDSCH on DL CC #i may be transmitted on one DL CC #(i % A) of the PDCCH-transmittable DL CCs #0 to #(A−1). Similarly, a UL grant PDCCH associated with transmission of a PUSCH on UL CC #j can be transmitted on one DL CC #(j % A) of the PDCCH-transmittable DL CCs #0 to #(A−1). (m % n) represents the remainder of dividing m by n.

In another example, if A DL CCs are available for transmission of a DL channel assignment PDCCH or a UL grant PDCCH, one or more of these DL CCs, DL CC #k (k=0, . . . , A−1) may be grouped with one or more of DL CCs that are not available for transmission of a DL channel assignment PDCCH or a UL grant PDCCH (this group may also be represented as a relation or linkage). Alternatively or additionally, a DL CC for transmitting a UL grant PDCCH associated with a PUSCH transmitted on a UL CC may be designated in the following methods.

Method 1-1: A scheduling DL CC may be grouped with a scheduled UL CC (i.e. a relation may be determined/established between the scheduling DL CC and the scheduled UL CC) based on the grouping between a scheduling DL CC and a scheduled DL CC described in Method 2, without introducing an additional relation or grouping between a PDCCH-transmittable DL CC, DL CC #k (i.e. a scheduling DL CC) and a PUSCH-transmittable UL CC (i.e. a scheduled UL CC). For example, it may be regulated that a UL grant PDCCH for transmission of a PUSCH on a UL CC linked to DL CCs within a corresponding group is transmitted on DL CC #k.

Method 1-2: An additional relation establishing method or grouping method may be introduced between a PDCCH-transmittable DL CC, DL CC #k (i.e. a scheduling DL CC) and a PUSCH-transmittable UL CC (i.e. a scheduled UL CC). To be more specific, there is basically a UL CC, UL CC #h linked to DL CC #k and other UL CCs are not linked to DL CCs available for transmission of a UL grant PDCCH. In this case, one or more of the unlinked UL CCs may be grouped into a UL CC group and when a PUSCH is to be transmitted on the corresponding UL CCs, a UL grant PDCCH associated with the PUSCH transmission may be transmitted to a UE on DL CC #k.

The foregoing Method 1-1 and Method 1-2 have been described on the premise that one DL CC available for transmission of a DL channel assignment PDCCH or a UL grant PDCCH is included in a DL CC group or associated with a UL CC group. However, this is purely exemplary and thus a plurality of PDCCH-transmittable DL CCs may be included in a DL CC group or associated with a UL CC group, for a special reason (e.g. to achieve uniformity in terms of PDCCH load balancing).

Method 2: Relation Establishment Between DL CC for PDCCH Transmission and DL CC for PDSCH Transmission (or UL CC for PUSCH Transmission) Based on Explicit Signaling (e.g. RRC Signaling or L1/L2 PDCCH Control Signaling).

In the case of cross scheduling, information indicating an individual DL CC (i.e. a scheduling DL CC) configured to transmit a channel assignment PDCCH associated with transmission of a PDSCH on a DL CC (i.e. a scheduled DL CC) and/or to transmit a UL grant PDCCH associated with transmission of a PUSCH on a UL CC (i.e. a scheduled UL CC), or carrier configuration information may be signaled (or indicated) by UE-specific or cell-specific RRC signaling or L1/L2 PDCCH control signaling.

For example, if A DL CCs are available for transmission of a DL channel assignment PDCCH or a UL grant PDCCH, any of these DL CCs, DL CC #k (k=0, . . . , A−1) (i.e. a scheduling DL CC) may be grouped with one or more of the remaining DL CCs that are not available for transmission of a DL channel assignment DL CC or a UL grant DL CC (this group may be represented as a relation or linkage). In this grouping manner, DL CCs and/or UL CCs configured by a cell or eNB or assigned to a UE may be grouped cell-specifically or UE-specifically in a higher layer (higher-layer configuration) and the configuration information may be signaled to one or more UEs by RRC signaling or L1/L2 PDCCH control signaling. Alternatively or additionally, a DL CC for transmitting a UL grant PDCCH associated with a PUSCH transmitted on a UL CC may be designated as follows.

Method 2-1: A PDCCH-transmittable DL CC, DL CC #k (i.e. a scheduling DL CC) may be grouped with a PUSCH-transmittable UL CC (i.e. a scheduled UL CC) (that is, a relation may be determined/established between the scheduling DL CC and the scheduled UL CC) based on the grouping between a scheduling DL CC and a scheduled DL CC described in Method 2, without introducing an additional relation or grouping between the scheduling DL CC and the scheduled UL CC. For example, it may be regulated that a UL grant PDCCH for transmission of a PUSCH on a UL CC linked to DL CCs within a corresponding group is transmitted on DL CC #k. The relationship or grouping between a scheduling DL CC and a scheduled DL CC is configured in a higher layer (higher-layer configuration) and this configuration may be indicated by UE-specific or cell-specific RRC signaling or L1/L2 PDCCH control signaling, as described in Method 2.

Method 2-2: An additional relationship establishing method or grouping method may be introduced between a PDCCH-transmittable DL CC, DL CC #k (i.e. a scheduling DL CC) and a PUSCH-transmittable UL CC (i.e. a scheduled UL CC). To be more specific, there is basically a UL CC, UL CC #h linked to DL CC #k and other UL CCs are not linked to DL CCs available for transmission of a UL grant PDCCH. In this case, one or more of the unlinked UL CCs may be grouped into a UL CC group and when a PUSCH is to be transmitted on the corresponding UL CCs, a UL grant PDCCH associated with the PUSCH transmission may be transmitted to a UE on DL CC #k. Sub-grouping of DL CCs and/or UL CCs configured by the cell or eNB or assigned to a UE may be configured (higher-layer configuration) and indicated by UE-specific or cell-specific RRC signaling or L1/L2 PDCCH control signaling.

Figure 8:
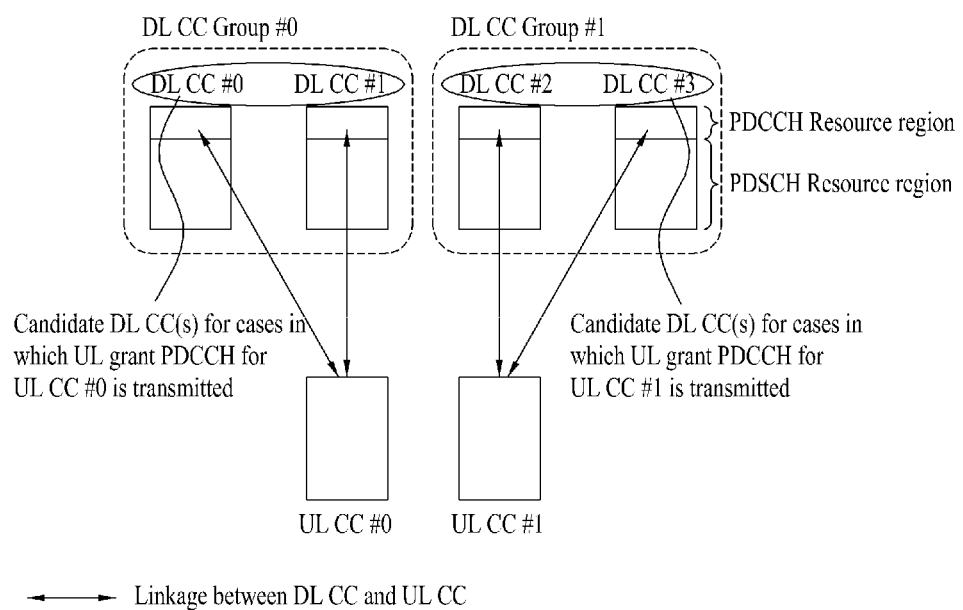

The foregoing Method 2-1 and Method 2-2 have been described on the premise that one DL CC available for transmission of a DL channel assignment PDCCH or a UL grant PDCCH is included in a DL CC group or associated with a UL CC group. However, this is purely exemplary and thus a plurality of PDCCH-transmittable DL CCs may be included in a DL CC group or associated with a UL CC group, for a special reason (e.g. to achieve uniformity in terms of PDCCH load balancing). FIGS. 8 and 9 illustrate exemplary DL CC grouping methods based on a linkage between a scheduling CC and scheduled UL and DL CCs in uplink scheduling and downlink scheduling, respectively. As illustrated in FIGS. 8 and 9, it is assumed that one scheduling DL CC is configured for any scheduled UL CC and any scheduled DL CC.

Referring to FIG. 8, it is assumed that a DL/UL linkage has been configured in such a manner that a UL grant PDCCH for UL CC #0 is transmitted on a DL CC assigned to or configured for a specific UE between the candidate DL CCs of DL CC #0 and/or DL CC #1 or on a dynamically selected one of the two DL CCs, and a UL grant PDCCH for UL CC #1 is transmitted on a DL CC assigned to or configured for a specific UE between the candidate DL CCs of DL CC #2 and/or DL CC #3 or on a dynamically selected one of the two DL CCs. In accordance with the embodiment of the present invention, a DL CC group is assumed to include a candidate DL CC or candidate DL CCs for transmitting a UL grant PDCCH for a specific UL CC. In this case, the UE may acquire grouping information for PDCCH blind decoding based on the DL/UL linkage information of FIG. 8 or may interpret a DL CC or DL CCs indicated by the linkage information as a group according to the embodiment of the present invention. Referring to FIG. 8, DL CC group #0 includes DL CC #0 and DL CC #1 in relation to UL CC #0 and DL CC group #1 includes DL CC #2 and DL CC #3 in relation to UL CC #1. Therefore, to receive a UL grant PDCCH for UL CC #0, the UE should perform PDCCH blind decoding on a specific DL CC assigned to or configured for the UE between DL CC #0 and DL CC #1 or on both DL CCs. Similarly, to receive a UL grant PDCCH for UL CC #1, the UE should perform PDCCH blind decoding on a specific DL CC assigned to or configured for the UE between DL CC #2 and DL CC #3 or on both DL CCs. That is, to receive a UL grant PDCCH, the UE divides total DL CCs into a plurality of groups (e.g. DL CC groups #0 and #1) and then performs PDCCH blind decoding on a DL CC group basis.

Referring to FIG. 9, a DL/UL linkage has been configured based on the premise that one of one or more DL CCs for transmission of a PDSCH on a DL CC (a scheduled DL CC) is designated as a scheduling DL CC for transmitting a DL channel assignment PDCCH, in such a manner that a DL channel assignment PDCCH for individual scheduled DL CCs, DL CC #0 to DL CC #2 is transmitted on at least one scheduling DL CC from among DL CC #0 to DL CC #2, and a DL channel assignment PDCCH for individual scheduled DL CCs, DL CC #3 and DL CC #4 is transmitted on at least one scheduling DL CC between DL CC #3 and DL CC #4. In accordance of the embodiment of the present invention, a DL CC group means a group of DL CCs configurable as a scheduling candidate DL CC or scheduling candidate DL CCs for transmitting a DL channel assignment PDCCH associated with transmission of a PDSCH from among one or more scheduling DL CCs. In this case, the UE may acquire grouping information for PDCCH blind decoding based on the DL/UL linkage information of FIG. 9 or may interpret a DL CC or DL CCs indicated by the linkage information as a group according to the embodiment of the present invention. To achieve this configuration, the UE may acquire information about a PDCCH-transmittable DL CC group, that is, a PDCCH monitoring CC set. The eNB may transmit the DL/UL linkage information, the scheduling CC/scheduled CC information, or the PDCCH monitoring CC set information to the UE by UE-specific, UE group-specific, or cell-specific RRC signaling, by a MAC message, or on an additional PDCCH.

In FIG. 9, DL CC group #0 includes DL CC #0, DL CC #1, and DL CC #2, and DL CC group #1 includes DL CC #3 and DL CC #4. Accordingly, when the UE is to receive a DL channel assignment PDCCH for PDSCH reception on at least one of DL CC #0, DL CC #1, and DL CC #2, the UE performs PDCCH blind decoding on at least one DL CC assigned to or configured for the UE from among DL CC #0, DL CC #1, and DL CC #2 or on all of DL CC #0, DL CC #1, and DL CC #2. Likewise, when the UE is to receive a DL channel assignment PDCCH for PDSCH reception on DL CC #3 and/or DL CC #4, the UE performs PDCCH blind decoding on at least one DL CC assigned to or configured for the UE from between DL CC #3 or DL CC #4 or on both DL CCs. That is, to receive a DL channel assignment PDCCH, the UE divides total DL CCs into a plurality of groups (e.g. DL CC groups #0 and #1)

and then performs PDCCH blind decoding on one or more specific DL CCs or all DL CCs of a group on a group basis.

In the case where DL CCs assigned to a UE or scheduling DL CCs are grouped into a plurality of carrier groups in order to reduce the PDCCH blind decoding overhead of the UE, the number of DL CCs in each carrier group is preferably as equal as possible. For example, up to 2 or 3 carrier groups may be configured. Only when the number of DL CCs assigned to the UE or the number of scheduling DL CCs is L (1L5) or smaller, one carrier group may be configured, whereas for more DL CCs than 5, 2 or 3 carrier groups may be configured. Table 3 illustrates an exemplary grouping scheme for DL CCs assigned to a UE or scheduling DL CCs.

TABLE 3

| Number of DL CC(s) | Number of carrier group(s) | Number of DL CC(s) for each carrier group {the first group. the second group} |
|---|---|---|
| 1 | 1 | {1} |
| 2 | 1 | {2} |
| 3 | 2 | {1.2} |
|   |   | {2.1} |
| 4 | 2 | {2.2} |
|   |   | {1.3} |
|   |   | {3.1} |
| 5 | 2 | {2.3} |
|   |   | {3.2} |
|   |   | {1.4} |
|   |   | {4.1} |
|   | 3 | {1.2.2} |
|   |   | {2.1.2} |
|   |   | {2.2.1} |
|   |   | {1.1.3} |
|   |   | {1.3.1} |
|   |   | {3.1.1} |

If DL CCs assigned to a UE are grouped in the manner illustrated in Table 2, the carrier grouping information may be signaled to the UE by UE-specific RRC signaling. Additionally, the carrier grouping information may be signaled to the UE semi-dynamically, or by L1/L2 control signaling to override carrier grouping signaled by RRC signaling. If a PDCCH or PDSCH of a legacy LTE format or a newly defined physical dedicated channel is used for this purpose, grouping information about DL CCs may be included in control signaling information of the channel.

The UE may acquire the carrier grouping information directly or implicitly through UE-specific DL/UL linkage information based on the premise that carrier grouping is performed based on a DL/UL linkage as described with reference to FIGS. 8 and 9. In this situation, the carrier grouping information according to the present invention may be defined and used as UE-specific DL/UL linkage information.

Figure 10:
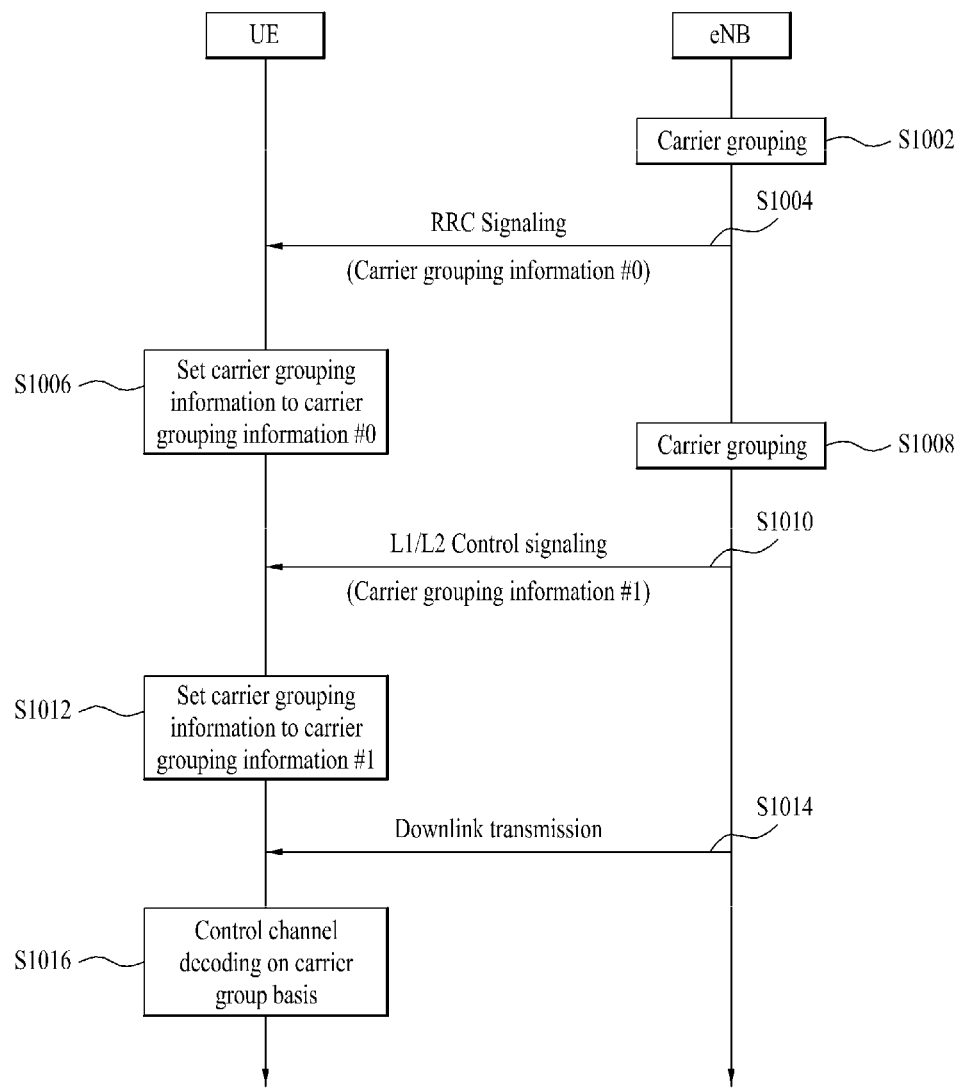
FIG. 10 illustrates another exemplary carrier grouping according to an embodiment of the present invention.

FIG. 10 illustrates exemplary signaling of carrier grouping information. Referring to FIG. 8, after an eNB groups carriers (S1002), the eNB transmits carrier grouping information #0 to a UE by RRC signaling (S1004). For example, carrier grouping information #0 may indicate that carrier group #0 includes DL CC #0 and DL CC #1 and carrier group #1 includes DL CC #4. The UE sets a configuration for performing PDCCH blind decoding using carrier grouping information #0 (S1006). Meanwhile, if L1/L2 control signaling (a PDCCH of a specific format or a format adding information to an existing format) is used to override carrier grouping information, the eNB re-groups the carriers (S1008) and transmits carrier grouping information #1 to the UE by L1/L2 control signaling (S1010). In this case, carrier grouping information #1 may indicate that carrier group #0 includes DL CC #1 and DL CC #2 and carrier group #1 includes DL CC #3 and DL CC #4. The UE replaces carrier grouping information #0 with carrier grouping information #1 (S1012). Subsequently, when the eNB transmits a downlink signal to the UE (S1014), the UE decodes a control channel (e.g. a PDCCH) on a carrier group basis based on the configured carrier grouping information. If carrier grouping information is overridden by a PDCCH of a specific format through L1/L2 control signaling, the UE may transmit an uplink ACK/NACK to the eNB upon detection of the corresponding PDCCH by blind decoding so that the eNB can determine whether the UE has received the signaling information successfully after transmitting the carrier grouping information. The eNB may transmit a scheduling PDCCH (i.e. a DL channel assignment PDCCH or a UL grant PDCCH) based on carrier grouping configured for downlink transmission, N subframes after transmitting the carrier grouping information or receiving the ACK/NACK after the carrier grouping information transmission.

Meanwhile, a primary PDCCH may be defined in order to signal UE-specific PDSCH transmission situation, related PDCCH configurations and multiplexing situation in view of transmission (i.e. assignment of a PDCCH-carrying DL CC) on a plurality of CCs. If DL CCs assigned to a UE or scheduling DL CCs are subjected to carrier grouping, carrier grouping information may be signaled to the UE on the primary PDCCH. In another example, if one or more PDSCHs are transmitted to the UE on a plurality of DL CCs or one or more PUSCHs are transmitted to the UE on a plurality of UL CCs, a specific PDCCH serving as a reference from among one or more PDCCHs available for PDSCH/PUCCH scheduling may include the carrier grouping information in its payload. When needed, a dedicated physical control channel may be defined additionally to transmit the carrier grouping information. While the dedicated physical channel may adopt a PDCCH format defined in the legacy LTE system (processed by functional blocks of the same type in a transmission viewpoint), the dedicated physical channel may be designed as a channel independent of the PDCCH, like a PCFICH.

Figure 11:
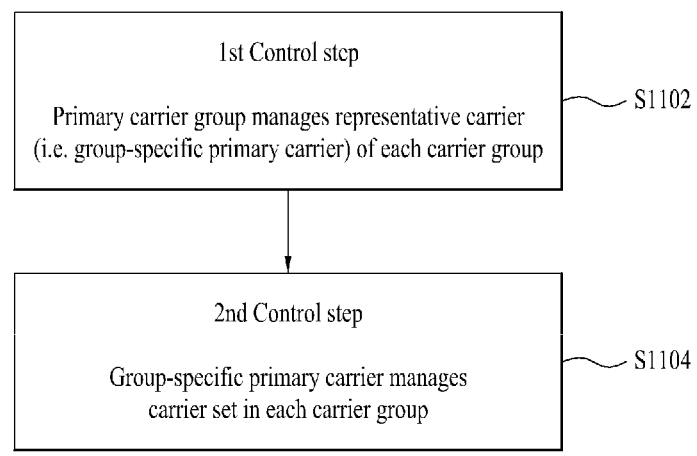
FIG. 11 illustrates a further exemplary carrier grouping according to an embodiment of the present invention.

Unlike the above description, carrier grouping may be controlled in two steps. An example of 2-step carrier grouping control is illustrated in FIG. 11. The operation of FIG. 11 is based on the assumption that one or more (UE-specific or cell-specific) carrier groups are configured between an eNB and a UE and a representative carrier (i.e. a group-specific primary carrier) is defined for each carrier group. In this case, a primary carrier group manages the primary carriers of the carrier groups (S1102) and each primary carrier manages the carriers of its carrier group (S1104). The term primary carrier may be replaced with other terms such as anchor carrier or reference carrier. The primary carrier covers both a primary DL CC and a primary UL CC and may be interpreted as a primary DL CC or a primary UL CC from the context.

In the present invention, the primary DL CC may refer to a DL CC that carries specific control information or a DL CC that carries a specific physical channel or physical signal. In the former case, the primary DL CC may be a DL CC carrying NAS (Non-access stratum) information such as authentication and/or security information, or a DL CC carrying control information related to CC management, CC reconfiguration, or link failure recovery. In the latter case, the primary DL CC may be a DL CC carrying a PDCCH containing common control information for UEs within an eNB (or a cell) or a PDSCH with a MAC message, or a DL CC carrying a PDCCH containing scheduling information (i.e. DL channel assignment control information and UL grant control information).

Similarly, the primary UL CC may refer to a UL CC carrying specific uplink control information or a UL CC carrying a specific physical channel or physical signal. In the former case, the primary UL CC may be a UL CC carrying uplink control information including an ACK/NACK (Acknowledgement/Negative-ACK) for a downlink PDSCH transmission, CSI (Channel Status Information) such as a CQI (Channel Quality Indicator)/PMI (Precoding Matrix Index)/RI (Rank Indicator) for a specific DL CC, and an SR (Scheduling request).

Each carrier group may include any number of DL CCs or UL CCs. Control information about each carrier group may be transmitted or received in an independent manner from other carrier groups. For instance, operations related to each carrier group, including carrier aggregation/release/DRX (Discontinuous Reception)/DTX (Discontinuous Transmission)/Sleep may be managed through the primary carrier of the carrier group and associated control information may also be transmitted through the primary carrier. For one carrier group, a primary carrier may be configured only for downlink or uplink. Information about each carrier group is managed in a primary carrier group and control information required for managing the carrier group may be transmitted/received through the primary carrier of the carrier group. The control information managed by the primary carrier group includes information about operations such as carrier aggregation/release/DRX/DTX/sleep, etc. for the carrier groups that the UE accommodates. Therefore, management of other carrier groups and management of the primary carrier group take place simultaneously in the primary carrier group. In a specific example, the primary carrier of the primary carrier group may transmit control information about operations of all other carriers including carrier aggregation/release/DRX/DTX/sleep, etc. to the UE, UE-specifically or UE-commonly. Information about DL/UL shared channels and DL/UL control channels in each carrier group may be determined according to a control information transmission scheme of the carrier group. For example, a carrier group may transmit control information by joint coding. In another example, a carrier group may transmit control information by separate coding. In a further example, a carrier group reduces blind decoding using blind decoding-reducing control information through coordination information such as a group-specific primary PDCCH. Given a plurality of carrier groups, the above three control information transmission schemes may be applied independently to the individual carrier groups. That is, each carrier group does not need to have the same transmission scheme and an appropriate transmission mode may be selected for each carrier group according to the number of carriers in the carrier group.

Control information needed for managing carrier groups is additionally transmitted in the primary carrier group. This control information may be encoded separately from other control information. The control information may require an explicit ACK/NACK transmission from a UE, as described before and may use a different transmission scheme and error check scheme from other control information. This implies that the control information may not be decoded in every subframe. For example, it is possible for a scheduler to coordinate such that there is no need for blind decoding of other control information when control information needed for managing carrier groups is transmitted (that is, other PDCCHs may not be decoded when the control information for managing carrier groups is received). In another scheme, the control information for managing carrier groups may be transmitted together with other control information. For instance, the control information for managing carrier groups may be jointly encoded only with control information for managing the carriers of the primary carrier group. In addition, the control information for managing carrier groups may be jointly encoded with control information for a DL/UL control/shared channel.

Embodiment 2, Embodiment 3 and Embodiment 4 provide specific schemes for reducing the PDCCH blind decoding overhead of a UE using carrier grouping according to the present invention.

Embodiment 2

Hybrid Joint/Separate PDCCH Coding Scheme

A method for using a hybrid joint/separate PDCCH coding scheme in addition to carrier grouping according to the present invention will be described below. Specifically, one or more pieces of DL channel assignment information for PDSCH transmission and/or one or more pieces of UL grant information for PUSCH transmission may be combined into one piece of control information within each carrier group and then encoded (a joint PDCCH coding scheme). On the other hand, control information in different carrier groups may be separately channel-encoded (a separate PDCCH coding scheme). In contrast, it may be contemplated that each piece of DL channel assignment information and/or each piece of UL grant information is configured as individual control information and then channel-encoded by applying the separate PDCCH coding scheme within each carrier group. The individual control information may be defined as DL channel assignment information or UL grant information for an individual PDSCH or PUSCH to be transmitted on a scheduled DL CC or UL CC within the carrier group. If a plurality of carrier groups are configured, DL CCs or UL CCs may be paired between the carrier groups and PDSCH channel assignment information or PUSCH grant information of each pair of carriers may be configured as individual control information and subjected to channel coding. On the other hand, DL CCs may be paired between carrier groups and control information about the paired carriers may be subjected to joint channel coding.

In the case of a single carrier group, a PDCCH may be configured basically by jointly encoding DL channel assignment information for PDSCH transmission and/or UL grant information for transmission of a PUSCH on UL CCs linked to DL CCs of the carrier group. Unlike this scheme, the DL channel assignment control information for PDSCH transmission and/or the UL grant control information for PUSCH transmission may be separately encoded according to the number of PDSCHs and/or PUSCHs, thereby configuring individual PDCCHs according to the characteristics of a system situation.

To reduce complexity imposed on a system or standard, the PDCCH coding and configuration scheme according to the embodiment of the present invention may be selectively applied in the case of transmission of a PDSCH and/or a PUSCH on N (2N5) or more downlink and/or uplink scheduled CCs, while a default PDCCH coding and configuration scheme (e.g. separate coding) may be applied in the other cases. In another approach, the PDCCH coding and configuration scheme according to the embodiment of the present invention may be applied to a PDSCH and/or PUSCH scheduling PDCCH in the case of assignment of N (2N5) or more UE-specific downlink and/or uplink carriers, while a default PDCCH coding and configuration scheme (e.g. joint coding or separate coding) may be applied in the other cases. Meanwhile, to keep blind decoding overhead and decoding power consumption at an acceptable level in terms of a UE's capabilities, another PDCCH coding and configuration scheme may be selectively applied according to a predetermined number of blind decodings.

It has been described in the embodiment of the present invention that joint coding and separate coding are coding schemes for encoding PDCCH control information required to transmit a plurality of PDSCHs/PUSCHs on a plurality of CCs. However, this is purely exemplary. Thus, joint or separate coding schemes for UL grant PDCC control information and DL channel assignment PDCCH control information may be defined differently and the proposed schemes of the present invention may be used as PDCCH control channel coding and multiplexing schemes on the premise of one of the joint or separate coding schemes.

Embodiment 3

Use of Primary PDCCH

As described before with reference to FIGS. 8 and 9, an eNB may configure information about a configuration status of a scheduled DL CC and a scheduled UL CC for a UE and information about a linkage between a scheduled DL CC or UL CC and one or more scheduling DL CCs and may signal the configuration status information and the linkage information to the UE by UE-specific RRC signaling or L1/L2 control signaling in the present invention. Now, an exemplary method for signaling control information leading to effective blind decoding (hereinafter, referred to blind decoding-related information) as additional or independent control information to a UE in order to reduce PDCCH blind decoding overhead according to an embodiment of the present invention will be given. This control information may be signaled on a PDCCH having a PDCCH format (or DCI format) defined in the legacy LTE system (e.g. a UL grant PDCCH, a DL channel assignment PDCCH, etc.), a PDCCH having a newly defined PDCCH format (or DCI format), or a newly defined dedicated physical channel (e.g. a PCFICH). For the convenience' sake of description, a control channel carrying the blind decoding-related information will be referred to as a primary PDCCH. The term primary PDCCH may be replaced with many other terms such as reference PDCCH, first PDCCH, etc. The blind decoding-related information may be included in the payload of the primary PDCCH.

The blind decoding-related information may include, for example, configuration status information about a scheduled DL CC or UL CC for PDSCH or PUSCH transmission or the afore-described DL/UL linkage information. The DL/UL CC configuration status information may be associated with configuration information or overriding information about UE-specifically assigned DL CCs and/or UL CCs. The DL/UL CC configuration information includes information about an arbitrary linkage made for UL CCs and DL CCs as well as information about the linkage between DL CCs and UL CCs illustrated in FIG. 7. The DL/UL linkage information includes, for example, information about a linkage between a scheduling CC and a scheduled CC as illustrated in FIGS. 8 and 9. In addition, the blind decoding-related information may include at least one of information about the positions of physical or logical (e.g. CCEs) resources for a PDCCH, information about a CCE aggregation level related to an effective code rate, and DCI format information. The blind decoding-related information may be defined as overall control information, alone or along with other PDCCH transmission-related information (e.g. DL channel assignment information or UL grant information).

If the carrier grouping scheme of the present invention is also adopted, the blind decoding-related information may include carrier grouping information. For example, the blind decoding-related information may include at least one of information about the number of carrier groups, information about the indexes of carriers of each carrier group, information about the number of carriers in each carrier group, and information about a PDCCH control information coding/multiplexing (or configuration) scheme. Especially when carrier grouping is performed based on a conventional specific DL/UL linkage configuration, a UE may use signaling or an implicit relationship made through the specific DL/UL linkage configuration process, as the blind decoding-related information. The DL/UL linkage configuration includes information about any linkage that can be made among DL CCs and UL CCs (e.g. a linkage between a scheduling CC and a scheduled CC) as well as a linkage between DL CCs and UL CCs. The blind decoding-related information may be defined as overall control information, alone or along with other PDCCH transmission-related information.

A primary PDCCH may be transmitted periodically in every one or more subframes. In this case, the transmission cycle and offset of the primary PDCCH may be determined UE-specifically and signaled to a UE by RRC signaling. While the embodiment of the present invention is described focusing on the primary PDCCH designed to reduce blind decoding overhead, the same description can be applied to a PDCCH designed for the purpose of UE-specific downlink/or uplink carrier assignment (or overriding).

While it has been described above that a single primary PDCCH is defined for all of DL CCs and/or UL CCs assigned to or scheduled for a UE, this is exemplary and thus a plurality of primary PDCCHs may be defined. For example, a primary PDCCH for DL channel assignment PDCCHs that schedule PDSCHs may be used separately from a primary PDCCH for UL grant PDCCHs for scheduling PUSCHs. In another example, a primary PDCCH may be defined per carrier group and each primary PDCCH may deliver information about a PDCCH coding and configuration scheme used for L1/L2 control information for DL channel assignment or a UL grant in each carrier group (i.e. the 2-step UE blind decoding scheme is applied on a carrier group basis). In this case, the number of primary PDCCHs may be equal to the number of carrier groups. In addition, a primary PDCCH may be separately defined for all of DL CCs assigned to or scheduled for a specific UE (i.e. a 3-step UE blind decoding scheme). Then, the number of primary PDCCHs may be (the number of carrier groups+1).

Embodiment 4

Configuration of Downlink Primary Carrier

One or more of DL CCs (or UL CCs) available to an eNB (or cell) may be assigned as primary carriers, UE-specifically, UE-group specifically, cell-specifically, or cell cluster-specifically. The term primary carrier may be replaced with many other terms such as anchor carrier or reference carrier. The primary carrier covers both a primary DL CC and a primary UL CC and may be interpreted as a primary DL CC or a primary UL CC from the context.

In the present invention, the primary DL CC may refer to a DL CC that carries specific control information or a DL CC that carries a specific physical channel or physical signal. In the former case, the primary DL CC may be a DL CC carrying NAS (Non-access stratum) information such as authentication and/or security information, or a DL CC carrying control information related to CC management, CC reconfiguration, or link failure recovery. In the latter case, the primary DL CC may be a DL CC carrying a PDCCH containing common control information for UEs within an eNB (or a cell) or a PDSCH with a MAC message, or a DL CC carrying a PDCCH containing scheduling information (i.e. DL channel assignment control information and UL grant control information).

Similarly, the primary UL CC may refer to a UL CC carrying specific uplink control information or a UL CC carrying a specific physical channel or physical signal. In the former case, the primary UL CC may be a UL CC carrying uplink control information including an ACK/NACK (Acknowledgement/Negative-ACK) for a downlink PDSCH transmission, CSI (Channel Status Information) such as a CQI (Channel Quality Indicator)/PMI (Precoding Matrix Index)/RI (Rank Indicator) for a specific DL CC, and an SR (Scheduling request).

Now a description will be given of a method for applying carrier grouping and a primary PDCCH according to the present invention, when a primary carrier is configured.

Method A: Carriers (e.g. DL CCs) except a primary carrier may be subjected to carrier grouping according to the present invention. When a primary PDCCH of the present invention is used, the primary PDCCH may be transmitted on the primary DL CC.

Method B: If one primary carrier is defined, all DL CCs including the primary carrier may be subjected to carrier grouping according to the present invention. When a primary PDCCH of the present invention is used, the primary PDCCH may be transmitted on the primary DL CC.

Primary carriers may be grouped into one group in Method A/B. The primary carrier group may include only the primary carriers or other DL CCs additionally.

Method C: If a plurality of primary carriers are defined, carriers may be grouped, taking into account the primary carriers, or the primary carriers may be designated in such a manner that each carrier group includes one or more primary carriers. Especially when a primary carrier means a DL CC delivering a PDCCH containing scheduling information (i.e. DL channel assignment control information and UL grant control information), it can be said that carrier groups are formed based on the linkage between a scheduling CC and a scheduled CC. In this case, a part or all of the DL CCs of the carrier group may be primary DL CCs. In a specific example, when individual scheduling CCs defined for scheduled DL CCs and/or scheduled UL CCs assigned UE-specifically or UE-commonly are replaced with a specific common DL CC in a cross-carrier scheduling environment, the DL CC may be defined as a UE-specific or UE-common primary DL CC. Meanwhile, if a primary PDCCH is used according to the present invention, the primary PDCCH may be transmitted on the primary DL CC.

Method D: Independently of a DL CC configuration, a primary carrier may be defined according to a UL CC configuration. For example, a primary DL CC for UL CCs may be defined as a carrier delivering information about a UL shared channel or control information about a UL control channel. If UL control information and DL control information are not jointly encoded, a UE should detect the UL control information by blind decoding in a search space set in a PDCCH search space specific to a CCE aggregation level. To reduce the number of blind decodings, it is reasonable to set a UL information search space to coincide or overlap with a DL information search space. For example, if DL control information and UL control information are identical in channel code length and different in format, blind decoding to the same length/at the same positions may be interpreted commonly for the DL/UL. Accordingly, if the DL control information and the UL control information are separately encoded, the same primary carrier may be defined to transmit the control information. That is, it is preferred to set a carrier in which to search for the UL control information as a carrier in which to search for the DL control information. Meanwhile, the scheme of regulating DL and UL control information search carriers to be identical and a scheme of freely setting DL and UL control information search carriers (i.e. different DL and UL control information search carriers) may be selectively used according to the capabilities of a UE.

Figure 12:
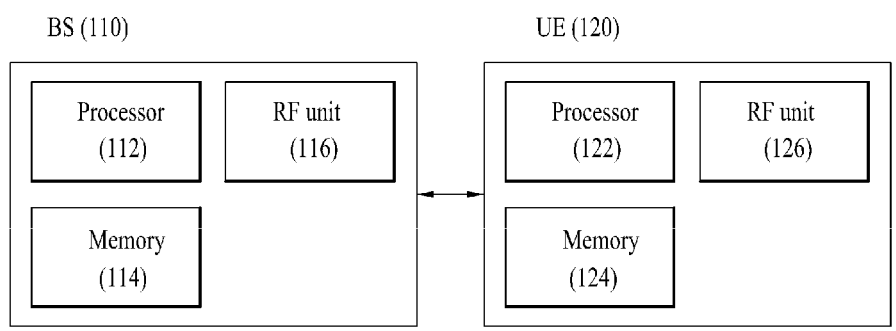
FIG. 12 is an exemplary block diagram of a BS and a UE according to an embodiment of the present invention.

FIG. 12 illustrates an exemplary BS and an exemplary UE that can be applied to the embodiments of the present invention.

Referring to FIG. 12, a wireless communication system includes a BS 110 and a UE 120. A transmitter is a part of the BS 110 and a receiver is a part of the UE 120, on a downlink, whereas a transmitter is a part of the UE 120 and a receiver is a part of the BS 110. The BS 110 includes a processor 112, a memory 114, and a Radio Frequency (RF) unit 116. The processor 112 may be adapted to implement the procedures and/or methods proposed according to the present invention. The memory 114 is connected to the processor 112 and stores various types of information related to operations of the processor 112. The RF unit 116 is connected to the processor 112 and transmits and/or receives radio signals. The MS 120 includes a processor 122, a memory 124, and an RF unit 126. The processor 122 may be adapted to implement the procedures and/or methods proposed according to the present invention. The memory 124 is connected to the processor 122 and stores various types of information related to operations of the processor 112. The RF unit 126 is connected to the processor 122 and transmits and/or receives radio signals. The BS 110 and/or the UE 120 may have a single antenna or multiple antennas.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made, centering on a data transmission and reception relationship among a BS and a UE. In some cases, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term, fixed station, Node B, 'eNode B (eNB), access point, etc. The term 'terminal' may be replaced with the term, UE (User Equipment), MS (Mobile Station), MSS (Mobile Subscriber Station), etc.

The embodiments of the present invention may be achieved by various means, for example, hardware, firmware, software, or a combination thereof. In a hardware configuration, an embodiment of the present invention may be achieved by one or more ASICs (application specific integrated circuits), DSPs (digital signal processors), DSDPs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to a wireless communication system and, more particularly, to a method and apparatus for configuring CCs in wireless communication system supporting carrier aggregation.

The invention claimed is:

1. A method for receiving a data at a UE (User Equipment) in a wireless communication system supporting carrier aggregation, the method comprising:
configuring j carrier groups, wherein j is an integer of 2 or more; and
performing a procedure for receiving the data from Component Carrier (CC) #i,
wherein the procedure includes;
detecting a Physical Downlink Control Channel (PDCCH) for the UE by blind decoding PDCCH candidates in a carrier group #(i % j) of the j carrier groups, wherein the 'i % j' represents a remainder of dividing i by j, and
receiving the data through a Physical Downlink Shared Channel (PDSCH) corresponding the PDCCH in the CC #i.

2. The method according to claim 1, wherein the PDCCH is transmitted in a control information region in a subframe, in which the control information includes one or more contiguous OFDM (Orthogonal Frequency Division Multiplexing) symbols.

3. The method according to claim 1, further comprising:
receiving information of a number of carrier groups through RRC (Radio Resource Control) signaling or L1/L2 (Layer1/Layer2) control signaling.

4. A UE (User Equipment) supporting carrier aggregation, comprising:
a Radio Frequency (RF) unit for transmitting and receiving a radio signal to and from a Base Station (BS) on multiple component carriers (CCs);
a memory for storing information transmitted to and received from the BS and a parameter needed for an operation of the UE; and
a processor connected to the RF unit and the memory, for controlling the RF unit and the memory,
wherein the processor comprises to configure j carrier groups, wherein j is an integer of 2 or more; and to perform a procedure for receiving the data from Component Carrier (CC) #i,
wherein the procedure includes; detecting a Physical Downlink Control Channel (PDCCH) for the UE by blind decoding PDCCH candidates in a carrier group #(i % j) of the j carrier groups, wherein the 'i % j' represents the remainder of dividing i by j, and receiving the data through a Physical Downlink Shared Channel (PDSCH) corresponding the PDCCH in the CC #i.

5. The UE according to claim 4, wherein the PDCCH is transmitted in a control information region in a subframe, in which the control information includes one or more contiguous OFDM (Orthogonal Frequency Division Multiplexing) symbols.

6. The UE according to claim 4, further comprising:
receiving information of a number of carrier groups through RRC (Radio Resource Control) signaling or L1/L2 (Layer1/Layer2) control signaling.

* * * * *